US012568458B2

(12) United States Patent
Lin et al.

(10) Patent No.: US 12,568,458 B2
(45) Date of Patent: Mar. 3, 2026

(54) CONTROLLING METHOD FOR WIRELESS COMMUNICATION DEVICE

(71) Applicant: MEDIATEK Inc., Hsinchu City (TW)

(72) Inventors: Kuan-Yu Lin, Hsinchu City (TW);
Ya-ling Hsu, Hsinchu City (TW);
Wan-Ting Huang, Hsinchu City (TW);
Yi-Han Chung, Hsinchu City (TW);
Yi-Cheng Chen, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 341 days.

(21) Appl. No.: 18/499,298

(22) Filed: Nov. 1, 2023

(65) Prior Publication Data

US 2024/0147405 A1 May 2, 2024

Related U.S. Application Data

(60) Provisional application No. 63/421,589, filed on Nov. 2, 2022.

(51) Int. Cl.
*H04W 60/04* (2009.01)
*H04W 68/02* (2009.01)

(52) U.S. Cl.
CPC ........... *H04W 60/04* (2013.01); *H04W 68/02* (2013.01)

(58) Field of Classification Search
CPC .............................. H04W 60/04; H04W 68/02
USPC ........................................................ 370/329
See application file for complete search history.

(56) References Cited

U.S. PATENT DOCUMENTS

| | | | | |
|---|---|---|---|---|
| 10,334,525 B1 * | 6/2019 | Govindassamy | ............................ H04W 52/0219 | |
| 10,360,409 B2 * | 7/2019 | Park | ................. H04W 12/0433 | |
| 10,397,770 B2 * | 8/2019 | Li | ......................... H04W 8/183 | |
| 11,228,899 B2 * | 1/2022 | Ou | ......................... H04W 8/08 | |

(Continued)

FOREIGN PATENT DOCUMENTS

| | | | | | |
|---|---|---|---|---|---|
| GB | 2610485 A | * | 3/2023 | ............ | H04W 60/00 |
| WO | WO-2022009177 A1 | * | 1/2022 | ............ | H04W 88/06 |
| WO | WO-2023068982 A1 | * | 4/2023 | ............ | H04W 76/16 |

OTHER PUBLICATIONS

Sørseth, Christian. "Location disclosure in lte networks by using imsi catcher." Master's thesis, NTNU, 2017. (Year: 2017).*

(Continued)

*Primary Examiner* — Melvin H Pollack
(74) *Attorney, Agent, or Firm* — McClure, Qualey & Rodack, LLP

(57) ABSTRACT

A controlling method for a wireless communication device is provided. The controlling method for the wireless communication device includes: attaching a first Universal Subscriber Identity Module (USIM) to a Long-Term Evolution (LTE) network; determining whether a second USIM is camped on the LTE network; detecting whether a paging collision is happened, if the second USIM is camped on the LTE network; generating a requested International Mobile Subscriber Identity (IMSI) offset for the second USIM, if the paging collision is happened, wherein the requested IMSI offset is 1 or min(T, nB)−1, T is a default paging period and nB is a number of paging occurrences within the default paging period; transmitting an attach request with the requested IMSI offset to the LTE network for the second USIM; receiving a negotiated IMSI offset from the LTE network; and attaching the second USIM to the LTE network with the negotiated IMSI offset.

15 Claims, 7 Drawing Sheets

(56) References Cited

U.S. PATENT DOCUMENTS

| | | | | |
|---|---|---|---|---|
| 11,665,668 B2* | 5/2023 | Ryu | H04W 28/0865 | |
| | | | | 455/458 |
| 11,689,981 B2* | 6/2023 | Han | H04W 36/0055 | |
| | | | | 370/331 |
| 11,864,156 B2* | 1/2024 | Gupta | H04W 68/02 | |
| 11,864,157 B2* | 1/2024 | Guo | H04W 76/27 | |
| 11,997,643 B2* | 5/2024 | Shih | H04W 48/16 | |
| 12,041,524 B2* | 7/2024 | Shrestha | H04W 4/90 | |
| 12,101,739 B2* | 9/2024 | Brusilovsky | H04W 68/025 | |
| 12,120,636 B2* | 10/2024 | Xu | H04W 60/00 | |
| 12,219,518 B2* | 2/2025 | Chen | H04W 68/005 | |
| 12,238,670 B2* | 2/2025 | Hong | H04W 8/205 | |
| 12,256,362 B2* | 3/2025 | Liang | H04W 60/005 | |
| 12,324,017 B2* | 6/2025 | Talarico | H04L 1/187 | |
| 12,328,782 B2* | 6/2025 | Jung | H04W 72/0446 | |
| 12,363,524 B2* | 7/2025 | Shaheen | H04W 8/183 | |
| 12,389,368 B2* | 8/2025 | Gao | H04W 74/0825 | |
| 12,395,960 B2* | 8/2025 | Jung | H04W 60/005 | |
| 12,414,078 B2* | 9/2025 | Berggren | H04W 68/02 | |
| 12,432,547 B2* | 9/2025 | Khan | H04W 60/005 | |
| 12,432,708 B2* | 9/2025 | Raghavan | H04W 72/046 | |
| 2022/0225275 A1* | 7/2022 | Ying | H04W 8/02 | |
| 2022/0264506 A1* | 8/2022 | Kiss | H04W 68/02 | |
| 2023/0007624 A1* | 1/2023 | Murray | H04W 68/005 | |
| 2023/0033096 A1* | 2/2023 | Shaheen | H04W 24/08 | |
| 2023/0079012 A1* | 3/2023 | Ying | H04W 76/27 | |
| 2023/0122569 A1* | 4/2023 | Sriram | H04W 60/04 | |
| | | | | 455/458 |
| 2023/0144323 A1* | 5/2023 | Catovic | H04W 8/183 | |
| | | | | 370/329 |
| 2023/0232368 A1* | 7/2023 | Sabouri-Sichani | H04W 68/12 | |
| | | | | 370/329 |
| 2023/0300787 A1* | 9/2023 | Phan | H04W 68/005 | |
| | | | | 455/458 |
| 2023/0370837 A1* | 11/2023 | Schmitt | H04W 12/02 | |
| 2023/0379877 A1* | 11/2023 | Kumar | H04W 68/02 | |
| 2023/0403678 A1* | 12/2023 | Shrivastava | H04W 68/12 | |
| 2024/0089918 A1* | 3/2024 | Shrivastava | H04W 48/18 | |
| 2024/0276203 A1* | 8/2024 | Nagarajan | H04W 60/00 | |
| 2025/0016738 A1* | 1/2025 | Gupta | H04W 68/02 | |
| 2025/0063339 A1* | 2/2025 | Ahluwalia | H04W 8/20 | |

OTHER PUBLICATIONS

Mohammed Shafiul Alam Khan and Chris J Mitchell. 2017. Trashing IMSI catchers in mobile networks. In Proceedings of the 10th ACM Conference on Security and Privacy in Wireless and Mobile Networks (WiSec '17). Association for Computing Machinery, New York, NY, USA, 207-218. (Year: 2017).*

Shaik, Altaf. "Towards secure 4G and 5G access network protocols." PhD diss., Technische Universität Berlin, 2020. (Year: 2020).*

* cited by examiner

CONTROLLING METHOD FOR WIRELESS COMMUNICATION DEVICE

This application claims the benefit of U.S. provisional application Ser. No. 63/421,589, filed Nov. 2, 2022, the disclosure of which is incorporated by reference herein in its entirety.

TECHNICAL FIELD

The disclosure relates in general to a controlling method for an electric device, and more particularly to a controlling method for a wireless communication device.

BACKGROUND

Along with the development of wireless communication technology, some wireless communication devices may equip more than one Universal Subscriber Identity Module (USIM). In such wireless communication devices, the paging occasions (POs) configured by the network for the Multi-USIMs may be overlapped with each other and the paging collision cannot be avoided.

Further, if the paging occasions for the Multi-USIMs are far apart, the wireless communication device must be frequently waked up and the power consummation cannot be reduced.

SUMMARY

The disclosure is directed to a controlling method for a wireless communication device. If multi-USIMs are camped on different cells, paging occasions for the multi-USIMs are controlled to be separated to avoid the paging collision and the paging occasion gap between the multi-USIMs is controlled to be minimized to maximize the sleep ratio in the idle mode for reducing the power consumption of the wireless communication device. If the multi-USIMs are camped on the same cell, the paging occasion overlapping ratio is controlled to be maximized for reducing the power consumption of the wireless communication device.

According to one embodiment, a controlling method for a wireless communication device is provided. The controlling method for the wireless communication device includes: attaching a first Universal Subscriber Identity Module (USIM) to a Long-Term Evolution (LTE) network; determining whether a second USIM is camped on the LTE network; detecting whether a paging collision is happened, if the second USIM is camped on the different LTE cell of LTE network; generating a requested International Mobile Subscriber Identity (IMSI) offset for the second USIM, if the paging collision is happened, wherein the requested IMSI offset is 1 or $\min(T, nB)-1$, T is a default paging period and nB is a number of paging occurrences within the default paging period; transmitting an attach request with the requested IMSI offset to the LTE network for the second USIM; receiving a negotiated IMSI offset from the LTE network after transmitting the attach request with the requested IMSI offset to the LTE network; and attaching the second USIM to the LTE network with the negotiated IMSI offset.

According to another embodiment, a controlling method for a wireless communication device is provided. The controlling method for the wireless communication device includes: attaching a first Universal Subscriber Identity Module (USIM) to an LTE cell of a Long-Term Evolution (LTE) network; determining whether a second USIM is camped on the same LTE cell of the LTE network; generating a requested International Mobile Subscriber Identity (IMSI) offset for the second USIM to increase a paging occasion overlapping ratio between the first USIM and the second USIM; transmitting an attach request with the requested IMSI offset to the LTE network for the second USIM; receiving a negotiated IMSI offset from the LTE network after transmitting the attach request with the requested IMSI offset to the LTE network; and attaching the second USIM to the LTE network with the negotiated IMSI offset.

According to an alternative embodiment, a controlling method for a wireless communication device. The controlling method for the wireless communication device includes: attaching a first Universal Subscriber Identity Module (USIM) to a Long-Term Evolution (LTE) network; determining whether a second USIM is camped on the LTE network; attaching the second USIM to the LTE network with an accepted International Mobile Subscriber Identity (IMSI) offset which is different from a request IMSI offset; determining whether a paging occasion overlapping ratio is increased with the accepted IMSI offset; and transmitting an attach request or a tracking area update (TAU) request without the request IMSI offset to the LTE network to erase an alternative IMSI value, if the paging occasion overlapping ratio is increased.

Figure 1:
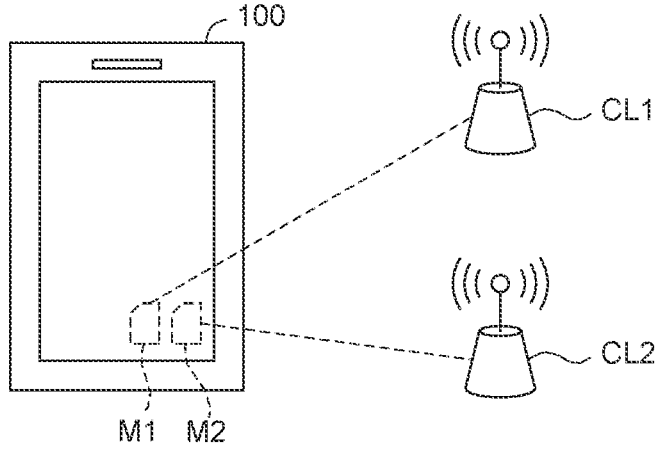
FIG. 1 shows a wireless communication device 100 with multi-USIM (Universal Subscriber Identity Module) according to one embodiment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

The terms "comprise," "comprising," "include," "including," "has," "having," etc. used in this specification are open-ended and mean "comprises but not limited." The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

Please refer to FIG. 1, which shows a wireless communication device 100 with multi-USIM (Universal Subscriber Identity Module) according to one embodiment. The wireless communication device 100 is, for example, a smart phone, a tablet computer, a smart watch or a laptop computer. The wireless communication device 100 includes, for example, a first USIM M1 and a second USIM M2. As shown in the FIG. 1, the first USIM M1 and the second USIM M2 may be camped on different Long-Term Evolution (LTE) cells CL1 and CL2. The paging occasions (POs) for the first USIM M1 and the second USIM M2 may be overlapped with each other to cause the paging collision. In this disclosure, the paging occasions for the first USIM M1 and the second USIM M2 are controlled to be separated to avoid the paging collision. Further, the paging occasion gap between the first USIM M1 and the second USIM M2 is controlled to be minimized to maximize the sleep ratio in the idle mode for reducing the power consumption of the wireless communication device 100.

Figure 2:
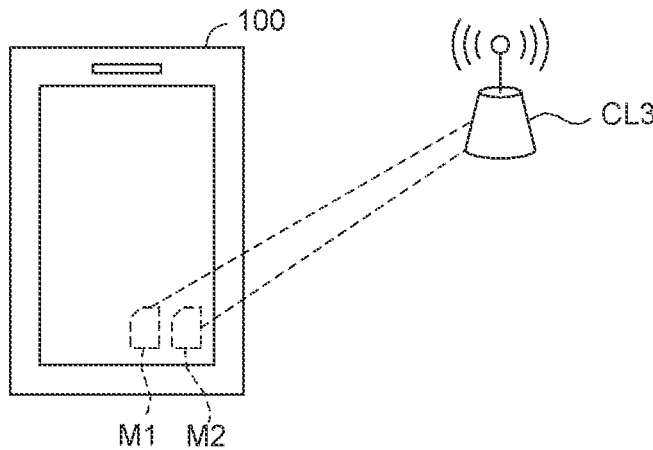
FIG. 2 shows the wireless communication device 100 with multi-USIM according to another embodiment.

Please refer to FIG. 2, which shows the wireless communication device 100 with multi-USIM according to another embodiment. As shown in the FIG. 2, the first USIM M1 and the second USIM M2 may be camped on the same LTE cell CL3. If the paging occasions for the first USIM M1 and the second USIM M2 are far apart, the wireless communication device 100 must be frequently waked up and the power consummation cannot be reduced. In this disclosure, the paging occasion overlapping ratio is controlled to be maximized. The wireless communication device 100 could monitor paging occasion as less as possible to reduce the power consumption.

Figure 3:
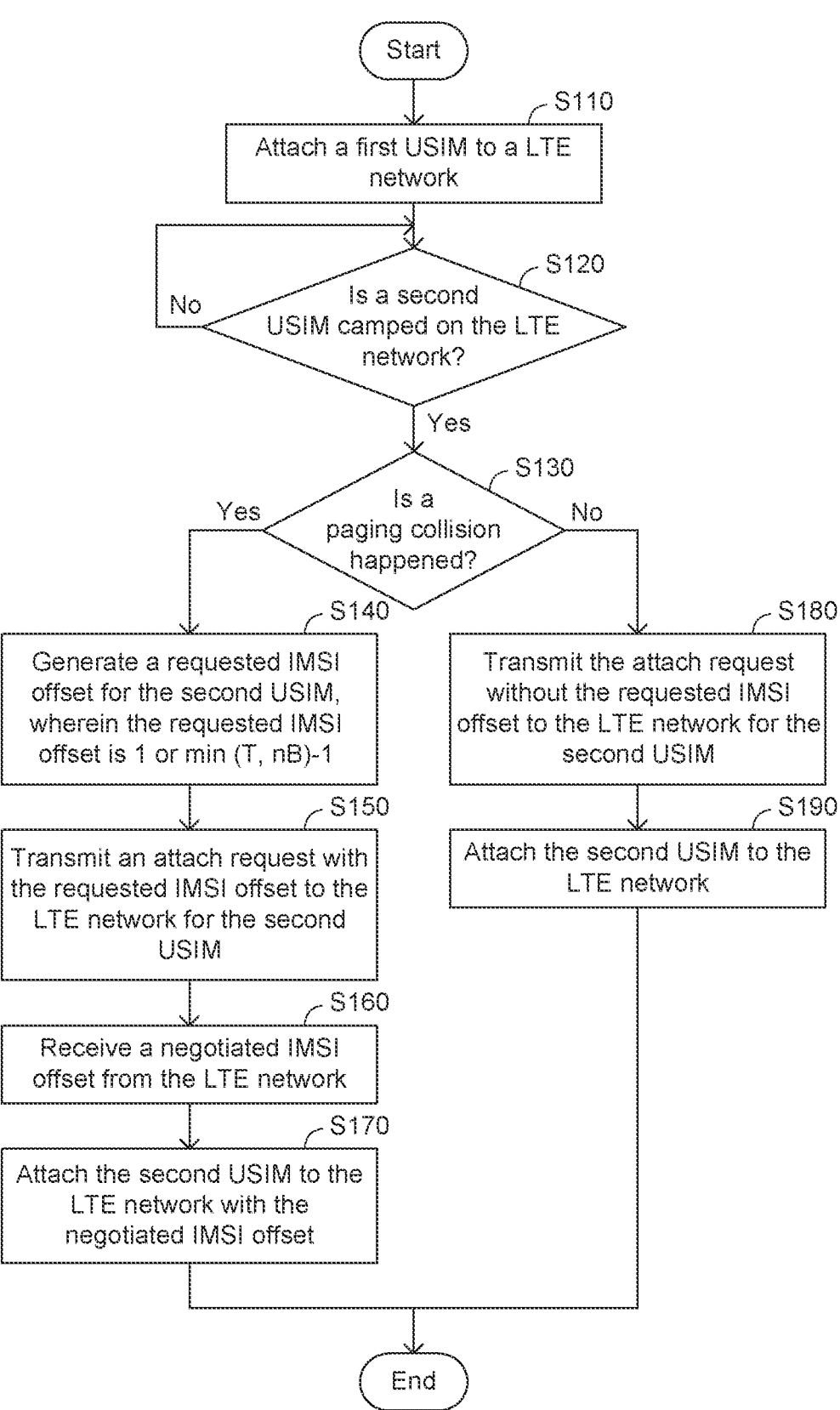
FIG. 3 shows a flowchart of a controlling method for the wireless communication device 100 according to one embodiment.
Figure 4:
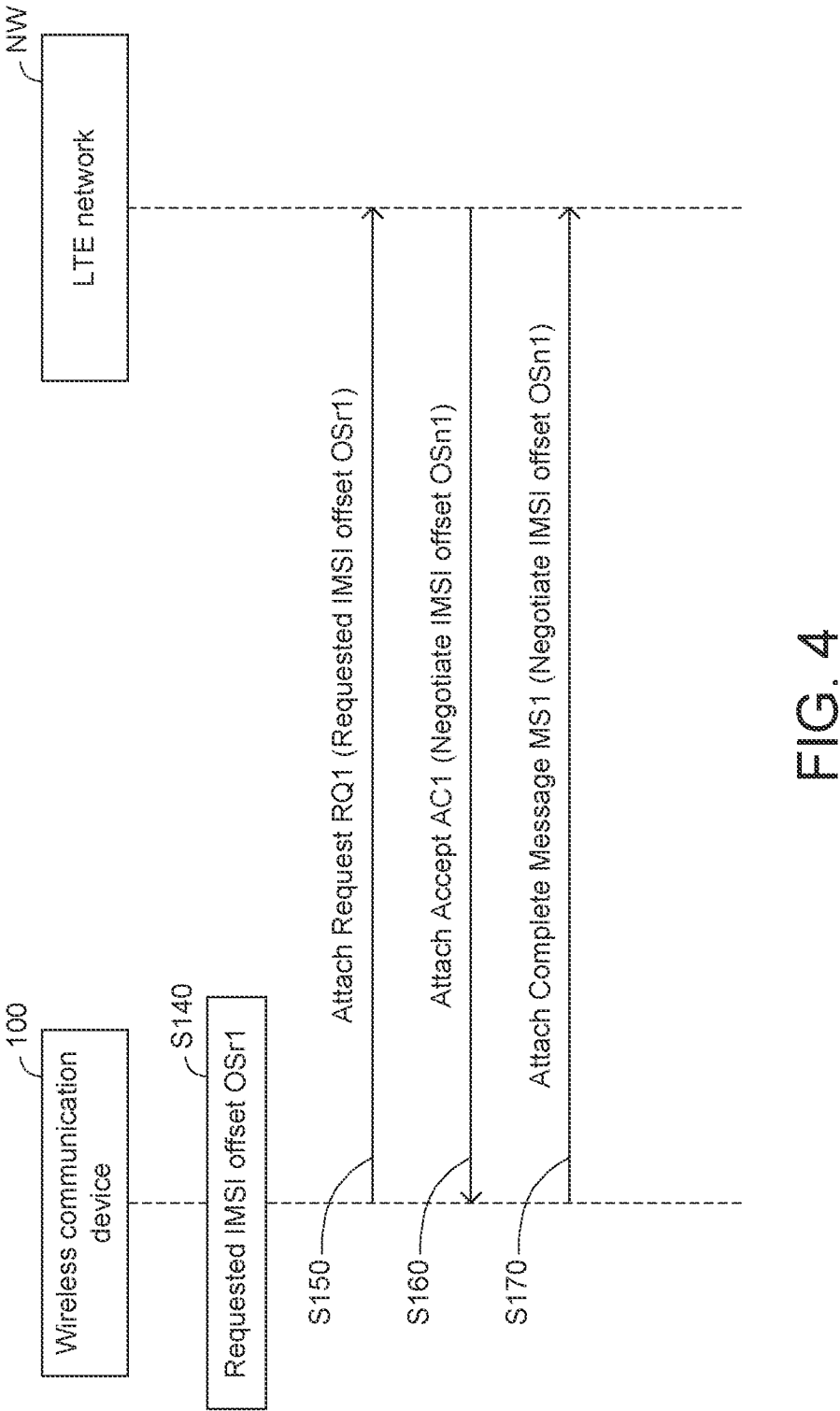
FIG. 4 illustrates some of the steps in the FIG. 3.

Please refer to FIG. 1, FIG. 3 and FIG. 4. FIG. 3 shows a flowchart of a controlling method for the wireless communication device 100 according to one embodiment. FIG. 4 illustrates some of the steps in the FIG. 3. As shown in the FIG. 1, when the first USIM M1 and the second USIM M2 are camped on different LTE cells CL1, CL2, the wireless communication device 100 could be controlled through the controlling method described in the FIG. 3 to avoid the paging collision and reduce the power consumption.

The controlling method described in the FIG. 3 includes steps S110 to S190. In the step S110, the first USIM M1 is attached to an LTE network NW.

Next, in the step S120, the wireless communication device 100 determines whether the second USIM M2 is camped on the LTE network NW or not. If the second USIM M2 is camped on the LTE network NW, the process proceeds to the step S130. In this embodiment, the first USIM M1 and the second USIM M2 are camped on different LTE cells CL1, CL2 (shown in the FIG. 1).

In the step S130, the wireless communication device 100 detects whether a paging collision is happened. If the paging collision is happened, the process proceeds to the step S140; if the paging collision is not happened, the process proceeds to the step S180.

Figure 5:
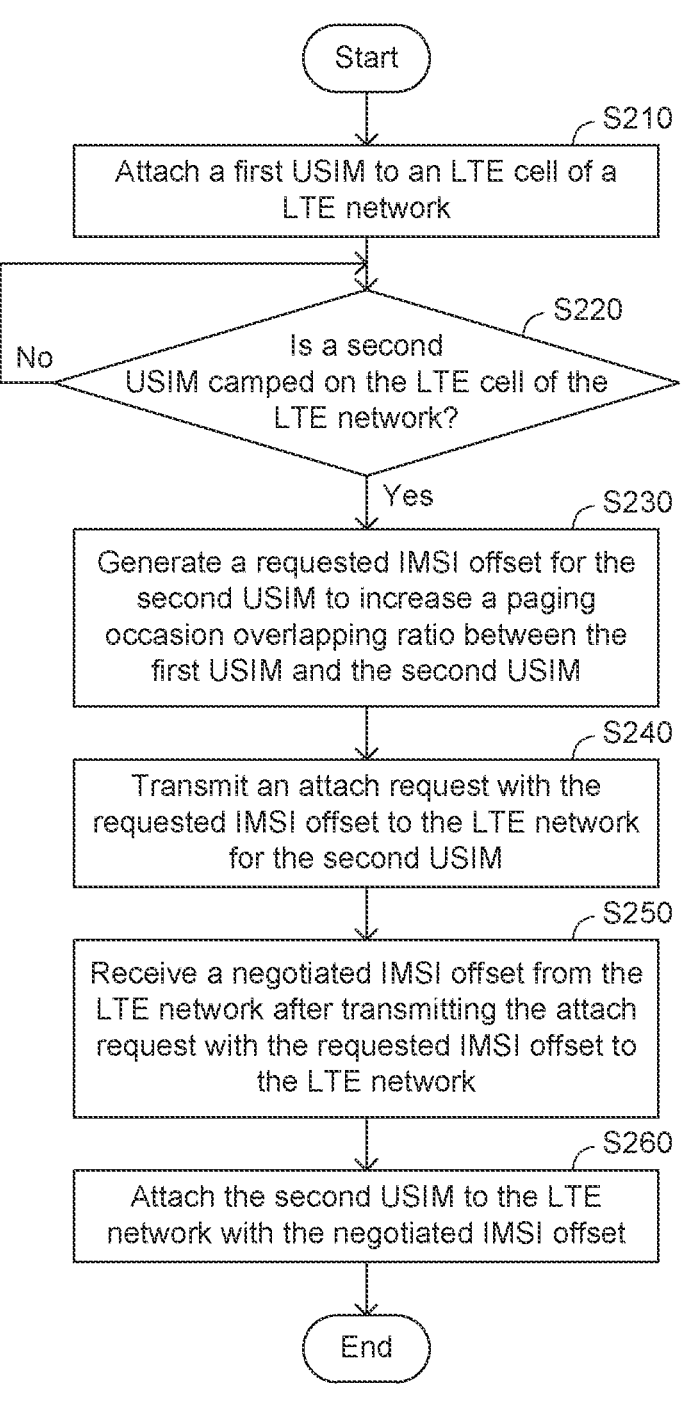
FIG. 5 shows a flowchart of a controlling method for the wireless communication device 100 according to another embodiment.

In the step S140, as shown in the FIG. 5, a requested International Mobile Subscriber Identity (IMSI) offset OSr1 for the second USIM M2 is generated. In this embodiment, the requested IMSI offset OSr1 is 1 or min (T, nB)−1. T and nB are parameters obtained from a system information block 2 (SIB2). T is a default paging period and nB is a number of paging occurrences within the default paging period. The requested IMSI offset OSr1 is used to separate the paging occasions of the first USIM M1 and the second USIM M2, and minimize the paging occasion gap between the first USIM M1 and the second USIM M2.

Next, in the step S150, as shown in the FIG. 5, the wireless communication device 100 transmits an attach request RQ1 with the requested IMSI offset OSr1 to the LTE network NW for the second USIM M2.

Afterwards, in the step S160, as shown in the FIG. 5, the wireless communication device 100 receives an attach accept AC1 with a negotiated IMSI offset OSn1 from the LTE network NW. The negotiated IMSI offset OSn1 may be identical to or different from the requested IMSI offset OSr1.

Then, in the step S170, as shown in the FIG. 5, the second USIM M2 is attached to the LTE network NW with the negotiated IMSI offset OSn1 and an attach complete message MS1 is transmitted to the LTE network NW.

On the other hand, in the step S180, the wireless communication device 100 transmits the attach request (not shown) without any requested IMSI offset to the LTE network NW for the second USIM M2.

Then, in the step S190, the second USIM M2 is attached to the LTE network NW and an attach complete message (not shown) is transmitted to the LTE network NW.

In this embodiment, the requested IMSI offset OSr1 is used to separate the paging occasions of the first USIM M1 and the second USIM M2, and minimize the paging occasion gap between the first USIM M1 and the second USIM M2. For example, the paging occasion gap between the first USIM M1 and the second USIM M2 could be controlled to be less than 5 system frame number, such as 1 system frame number.

Figure 6:
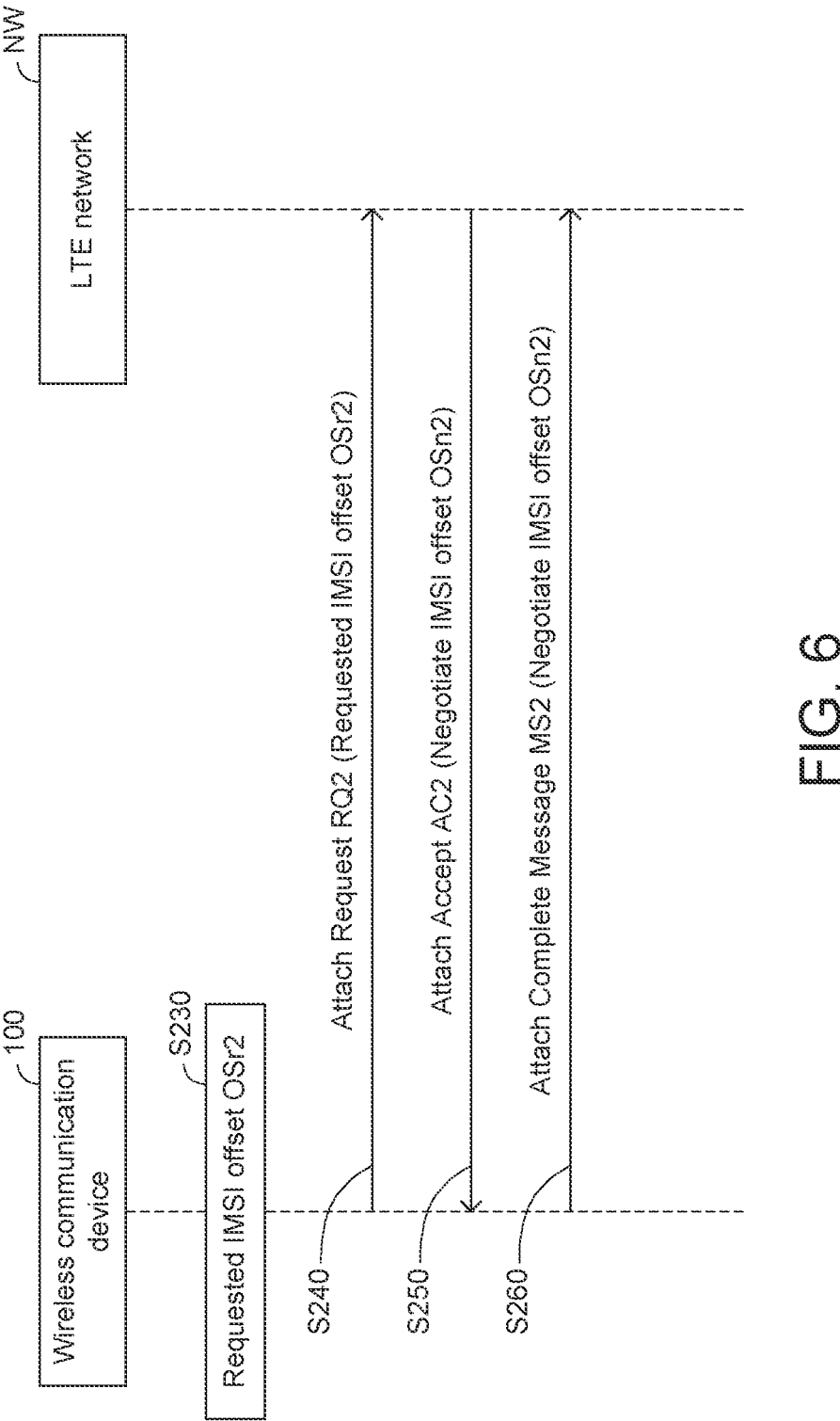
FIG. 6 illustrates some of the steps in the FIG. 5.

Please refer to FIG. 2, FIG. 5 and FIG. 6. FIG. 5 shows a flowchart of a controlling method for the wireless communication device 100 according to another embodiment. FIG. 6 illustrates some of the steps in the FIG. 5. As shown in the FIG. 2, when the first USIM M1 and the second USIM M2 are camped on the same LTE cell CL3, the wireless communication device 100 could be controlled through the controlling method described in the FIG. 5 to maximize the paging occasion overlapping ratio and the wireless communication device 100 could monitor paging occasion as less as possible to reduce the power consumption.

The controlling method described in the FIG. 5 includes steps S210 to S260. In the step S210, the first USIM M1 is attached to the LTE cell CL3 (shown in the FIG. 2) of the LTE network NW.

Then, in the step S220, the wireless communication device 100 determines whether the second USIM M2 is camped on the LTE cell CL3 of the LTE network NW or not. If the second USIM M2 is camped on the LTE cell CL3 of the LTE network NW, the process proceeds to the step S230.

In this embodiment, the first USIM M1 and the second USIM M2 are camped on the same LTE cell CL3.

In the step S230, as shown in the FIG. 6, a requested International Mobile Subscriber Identity (IMSI) offset OSr2 for the second USIM M2 is generated to increase the paging occasion overlapping ratio between the first USIM M1 and the second USIM M2. For example, the requested IMSI offset OSr2 is used to increase the paging occasion overlapping ratio by 10%.

Next, in the step S240, as shown in the FIG. 6, the wireless communication device 100 transmits an attach request RQ2 with a requested IMSI offset OSr2 to the LTE network NW for the second USIM M2.

Afterwards, in the step S250, as shown in the FIG. 6, the wireless communication device 100 receives an attached accept AC2 with a negotiated IMSI offset OSn2 from the LTE network NW. The negotiated IMSI offset OSn2 may be identical to or different from the requested IMSI offset OSr2.

Then, in the step S260, as shown in the FIG. 6, the second USIM M2 is attached to the LTE network NW with the negotiated IMSI offset OSn2 and an attach complete message MS2 is transmitted to the LTE network NW.

In this embodiment, the requested IMSI offset OSr2 is used to maximize the paging occasion overlapping ratio and the wireless communication device 100 could monitor paging occasion as less as possible to reduce the power consumption.

Figure 7:
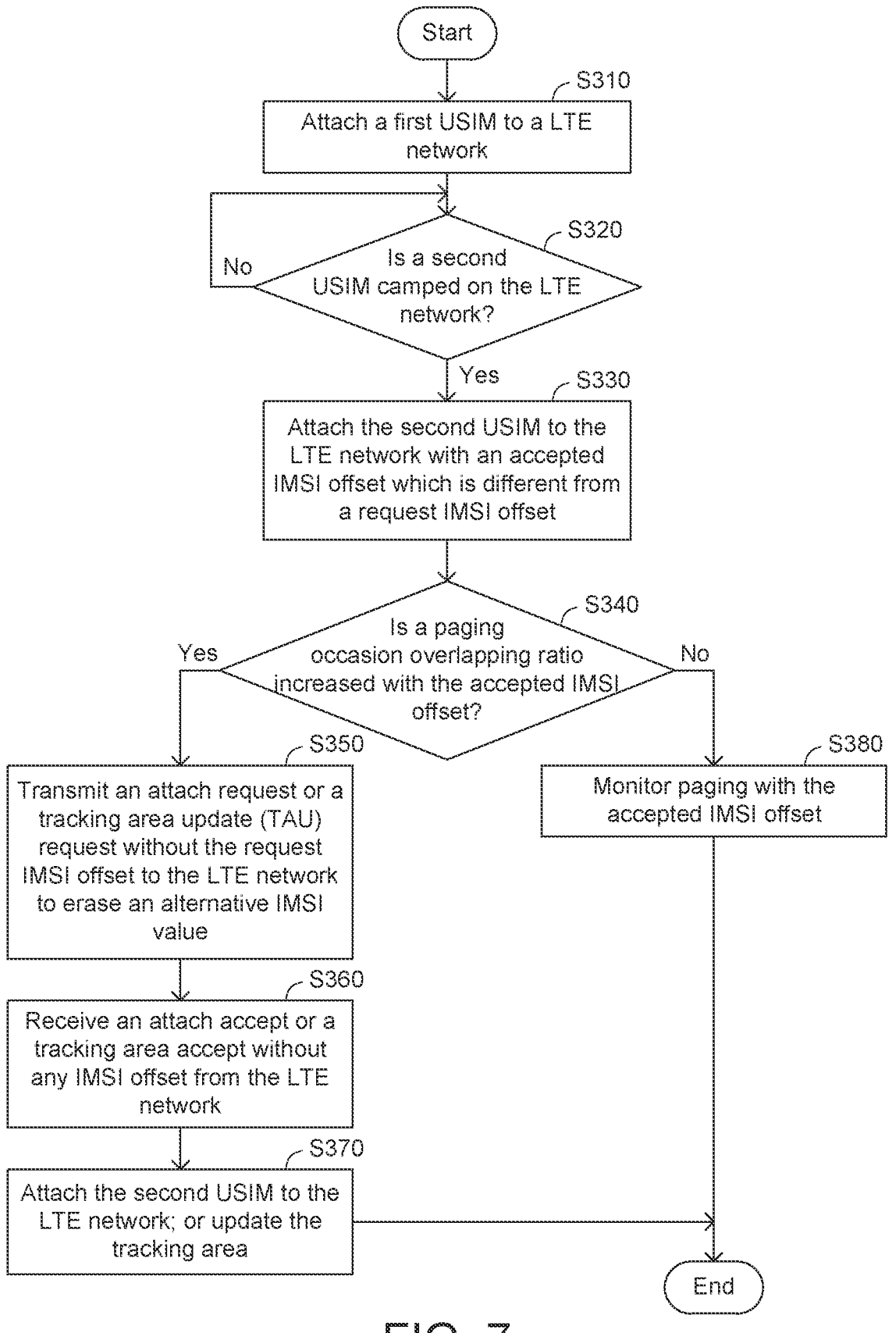
FIG. 7 shows a flowchart of a controlling method for the wireless communication device 100 according to another embodiment.
Figure 8:
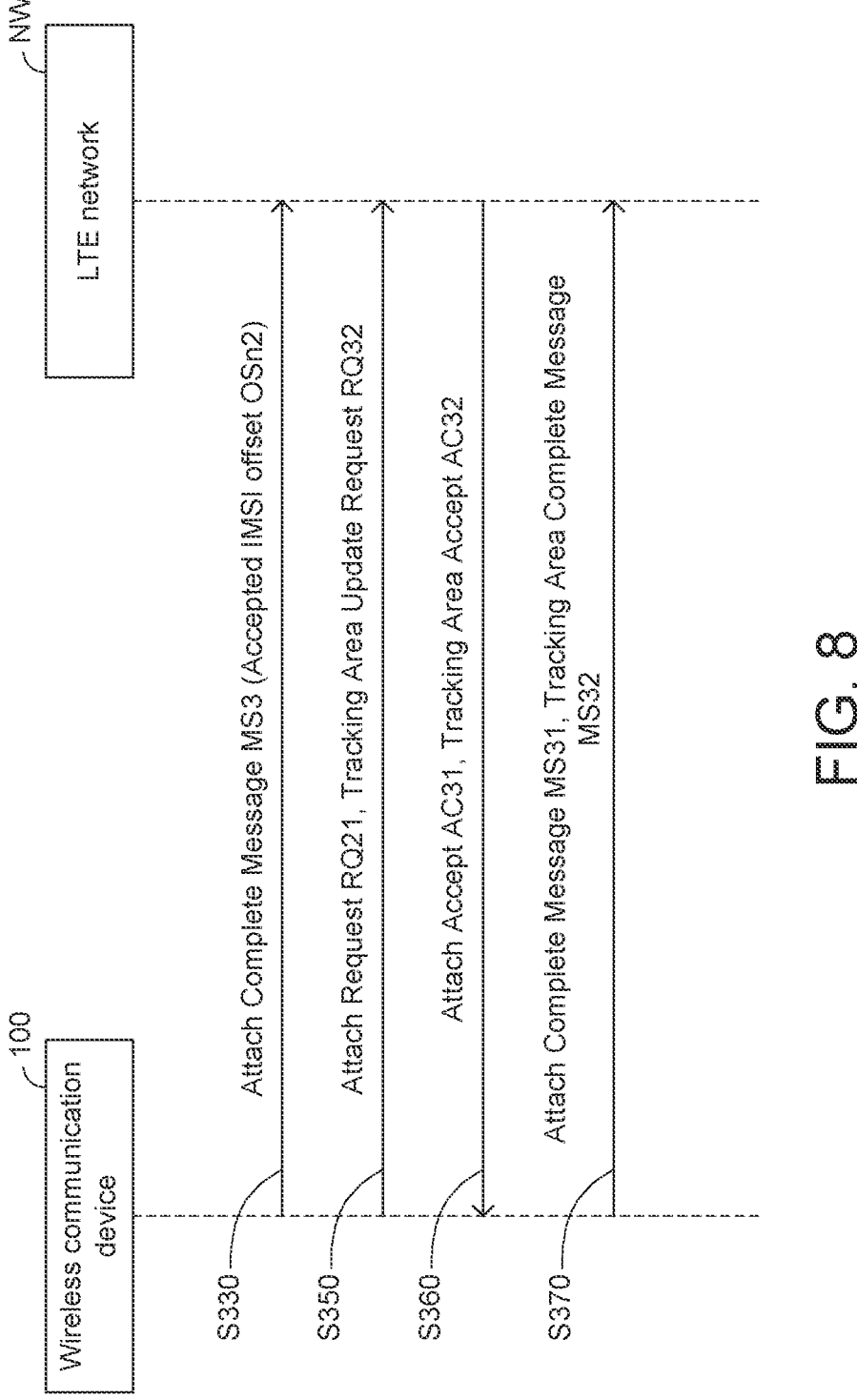
FIG. 8 illustrates some of the steps in the FIG. 7.

Please refer to FIG. 1, FIG. 7 and FIG. 8. FIG. 7 shows a flowchart of a controlling method for the wireless communication device 100 according to another embodiment. FIG. 8 illustrates some of the steps in the FIG. 7. As shown in the FIG. 1, when the first USIM M1 and the second USIM M2 are camped on different LTE cells CL1, CL2, the wireless communication device 100 could be controlled through the controlling method described in the FIG. 7 to avoid the paging collision.

The controlling method described in the FIG. 7 includes steps S310 to S380. In the step S310, the first USIM M1 is attached to the LTE network NW.

Next, in the step S320, the wireless communication device 100 determine whether the second USIM M2 is camped on the LTE network NW or not. If the second USIM M2 is camped on the LTE network NW, the process proceeds to the step S330. In this embodiment, the first USIM M1 and the second USIM M2 are camped on different LTE cells CL1, CL2 (shown in the FIG. 1).

In the step S330, as shown in the FIG. 8, the second USIM M2 is attached to the LTE network NW with an accepted International Mobile Subscriber Identity (IMSI) offset OSa3 which is different from a request IMSI offset, such as the request IMSI offset OSr1 shown in the FIG. 4.

Next, in the step S340, the wireless communication device 100 determines whether a paging occasion overlapping ratio is increased with the accepted IMSI offset OSa3. If the paging occasion overlapping ratio is increased with the accepted IMSI offset OSa3, the process proceeds to the step S350; if the paging occasion overlapping ratio is not increased with the accepted IMSI offset OSa3, the process proceeds to the step S380. In case of the paging occasion overlapping ratio is increased with the accepted IMSI offset OSa3 and the performance of the wireless communication device 100 would be downgraded.

In the step S350, as shown in the FIG. 8, the wireless communication device transmits an attach request RQ31 or a tracking area update (TAU) request RQ32 without the request IMSI offset to the LTE network NW to erase an alternative IMSI value in the LTE network NW.

Afterwards, in the step S360, as shown in the FIG. 8, the wireless communication device 100 receives an attach accept AC31 or a tracking area accept AC32 without any IMSI offset from the LTE network NW.

Then, in the step S370, as shown in the FIG. 8, the second USIM M2 is attached to the LTE network NW without any IMSI offset and an attach complete message MS31 is transmitted to the LTE network NW; or the tracking area is updated and a tracking area complete message MS32 is transmitted to the LTE network NW.

On the other hand, in the step S360, the wireless communication device 100 monitors paging with the accepted IMSI offset OSa3.

In this embodiment, the attach request RQ31 or the TAU request RQ32 without the request IMSI offset is used to erase an alternative IMSI value in the LTE network NW, such that the performance of the wireless communication device 100 could be kept without downgrading.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A controlling method for a wireless communication device, comprising:
   attaching a first Universal Subscriber Identity Module (USIM) to a Long-Term Evolution (LTE) network;
   determining whether a second USIM is camped on the LTE network;
   detecting whether a paging collision is happened, if the second USIM is camped on the LTE network;
   generating a requested International Mobile Subscriber Identity (IMSI) offset for the second USIM, if the paging collision is happened, wherein the requested IMSI offset is 1 or min (T, nB)−1, T is a default paging period and nB is a number of paging occurrences within the default paging period;
   transmitting an attach request with the requested IMSI offset to the LTE network for the second USIM;
   receiving a negotiated IMSI offset from the LTE network after transmitting the attach request with the requested IMSI offset to the LTE network; and
   attaching the second USIM to the LTE network with the negotiated IMSI offset.

2. The controlling method for the wireless communication device according to claim 1, wherein the first USIM and the second USIM are camped on different LTE cells.

3. The controlling method for the wireless communication device according to claim 1, wherein a paging occasion (PO) gap between the first USIM and the second USIM is 1 system frame number.

4. The controlling method for the wireless communication device according to claim 1, wherein a paging occasion (PO) gap between the first USIM and the second USIM is less than 5 system frame number.

5. The controlling method for the wireless communication device according to claim 1, further comprising:
   transmitting the attach request without the requested IMSI offset to the LTE network for the second USIM, if the paging collision is not happened.

6. The controlling method for the wireless communication device according to claim 1, wherein T is a parameter obtained from a system information block 2 (SIB2).

7. The controlling method for the wireless communication device according to claim 1, wherein nB is a parameter obtained from a system information block 2 (SIB2).

8. The controlling method for the wireless communication device according to claim 1, wherein the second USIM is camped on the LTE network after the first USIM is attached to the LTE network.

9. A controlling method for a wireless communication device, comprising:

attaching a first Universal Subscriber Identity Module (USIM) to an LTE cell of a Long-Term Evolution (LTE) network;

determining whether a second USIM is camped on the LTE cell of the LTE network;

generating a requested International Mobile Subscriber Identity (IMSI) offset for the second USIM to increase a paging occasion overlapping ratio between the first USIM and the second USIM;

transmitting an attach request with the requested IMSI offset to the LTE network for the second USIM;

receiving a negotiated IMSI offset from the LTE network after transmitting the attach request with the requested IMSI offset to the LTE network; and attaching the second USIM to the LTE network with the negotiated IMSI offset.

10. The controlling method for the wireless communication device according to claim 9, wherein the paging occasion overlapping ratio is increased by 10%.

11. The controlling method for the wireless communication device according to claim 9, wherein the second USIM is camped on the LTE cell of the LTE network after the first USIM is attached to the LTE cell of the LTE network.

12. A controlling method for a wireless communication device, comprising:

attaching a first Universal Subscriber Identity Module (USIM) to a Long-Term Evolution (LTE) network;

determining whether a second USIM is camped on the LTE network;

attaching the second USIM to the LTE network with an accepted International Mobile Subscriber Identity (IMSI) offset which is different from a request IMSI offset;

determining whether a paging occasion overlapping ratio is increased with the accepted IMSI offset; and transmitting an attach request or a tracking area update (TAU) request without the request IMSI offset to the LTE network to erase an alternative IMSI value, if the paging occasion overlapping ratio is increased.

13. The controlling method for the wireless communication device according to claim 12, wherein the first USIM and the second USIM are camped on different LTE cells.

14. The controlling method for the wireless communication device according to claim 12, further comprising:

monitoring paging with the accepted IMSI offset, if the paging occasion overlapping ratio is not increased.

15. The controlling method for the wireless communication device according to claim 12, wherein the second USIM is camped on the LTE network after the first USIM is attached to the LTE network.

\* \* \* \* \*